United States Patent
Chen

(10) Patent No.: US 10,445,088 B2
(45) Date of Patent: Oct. 15, 2019

(54) SYSTEM BOOT CODE CLONE

(71) Applicant: MACRONIX INTERNATIONAL CO., LTD., Hsinchu (TW)

(72) Inventor: Chih-Liang Chen, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 91 days.

(21) Appl. No.: 15/868,896

(22) Filed: Jan. 11, 2018

(65) Prior Publication Data

US 2019/0212999 A1 Jul. 11, 2019

(51) Int. Cl.
| | |
|---|---|
| *G06F 12/00* | (2006.01) |
| *G06F 8/654* | (2018.01) |
| *G06F 9/4401* | (2018.01) |
| *G06F 3/06* | (2006.01) |

(52) U.S. Cl.
CPC .......... *G06F 8/654* (2018.02); *G06F 3/0622* (2013.01); *G06F 3/0659* (2013.01); *G06F 3/0671* (2013.01); *G06F 9/4406* (2013.01)

(58) Field of Classification Search
CPC ...... G06F 8/654; G06F 3/0622; G06F 3/0659; G06F 3/0671; G06F 9/4406
See application file for complete search history.

(56) References Cited

U.S. PATENT DOCUMENTS

| 6,275,931 B1 | 8/2001 | Narayanaswamy et al. |
| 6,282,675 B1 | 8/2001 | Sun et al. |
| 6,401,221 B1 | 6/2002 | Sun et al. |
| 6,651,188 B2 | 11/2003 | Harding et al. |
| 6,748,480 B2 | 6/2004 | Chudnovsky et al. |
| 7,017,004 B1 * | 3/2006 | Calligaro ............ G06F 12/0223 365/230.01 |
| 7,237,145 B2 | 6/2007 | Sun et al. |
| 8,341,386 B2 | 12/2012 | Lee |

(Continued)

FOREIGN PATENT DOCUMENTS

| TW | 201319942 A | 5/2013 |
| TW | 201502991 A | 1/2015 |

(Continued)

OTHER PUBLICATIONS

EP Search Report from Related Application No. 18154123.6 dated Aug. 8, 2018, 10 pages.

*Primary Examiner* — Matthew Bradley
(74) *Attorney, Agent, or Firm* — Haynes Beffel & Wolfeld LLP

(57) ABSTRACT

A memory device includes a non-volatile memory configured with a block including first and second portions and an address decoder mapping received command addresses to physical addresses of the non-volatile memory. The memory device includes control circuitry maintaining a current status of the first portion and the second portion and implementing an update operation, including responsive to receiving a write command sequence to the block, causing the address decoder to (i) map the write command address to one of the first portion and the second portion, selected in response to the current status and (ii) update the selected one of the first portion and the second portion with the updated information, and upon completion of the updating, changing the current status to indicate that the selected one of the first and second portion is the current area.

20 Claims, 8 Drawing Sheets

(56) References Cited

U.S. PATENT DOCUMENTS

| | | |
|---|---|---|
| 8,504,796 B2 | 8/2013 | Iyer et al. |
| 8,880,862 B2 * | 11/2014 | Fallon ............... G06F 3/0613 713/2 |
| 9,158,683 B2 | 10/2015 | Kokrady et al. |
| 9,514,038 B2 | 12/2016 | Okin et al. |
| 2003/0229752 A1 * | 12/2003 | Venkiteswaran ..... G06F 9/4408 711/103 |
| 2008/0141016 A1 | 6/2008 | Chang et al. |
| 2014/0089561 A1 | 3/2014 | Pangal et al. |
| 2016/0276002 A1 | 9/2016 | Lee |

FOREIGN PATENT DOCUMENTS

| | | |
|---|---|---|
| TW | 201710888 A | 3/2017 |
| WO | 0007106 A1 | 2/2000 |

\* cited by examiner

SYSTEM BOOT CODE CLONE

BACKGROUND

Field

The present invention relates to a memory device storing code. In particular, the present technology pertains to managing and upgrading code, such as a Basic Input/Output System (BIOS) stored in non-volatile memory.

Description of Related Art

Typically, when a computer system is first turned on or rebooted, the first piece of software that is executed is system boot code, such as a Basic Input/Output System (BIOS), that is stored in non-volatile memory. When the boot code is executed it will usually run a self-test and a system-test on the computer system. The boot code also includes functions (executable code) for initializing and controlling the basic components of the computer system, such as the keyboard, the display, various disk drives (e.g., hard-disk drive, floppy disk drive, CD-ROM drive, DVD drive, etc.), and various communication ports, such as serial ports (e.g., the universal serial bus, etc.). The boot code can initialize a boot loader that will load the operating system from the appropriately selected disk drive. A computer system cannot boot up without valid and functional boot code.

Boot code is normally stored in non-volatile memory so that it is not erased every time the computer system reboots and so that it can be updated over time as new features are enabled, as the efficiency or functionality of the boot code is improved, or as bugs are fixed in the original boot code. Over time the ability to update the boot code has become much easier. For example, many computer systems are equipped with the functionality to upgrade themselves when new boot code is available by downloading a new version of the boot code over the internet.

Because of the critical nature of boot code, it is not safe to erase your current boot code and download a new version or just begin writing over your existing boot code without taking precautionary measures. This is because of the chance of a power failure or a system failure or the chance of downloading corrupted data. Without safety precautions in place, a user could be in a position where their existing boot code is fully or partially erased and the updated boot code is not available for execution. The result would be that their computer system would not properly boot up. As a result, to make the process of maintaining and updating boot code, conventional computer systems have implemented DualBIOS or TwinBIOS systems that allow a newer version of boot code to be downloaded to a separate backup flash memory while retaining the existing (i.e., currently working) boot code in the main BIOS flash memory. For example, conventional computer systems include a motherboard with a main BIOS (boot code) flash memory and a backup BIOS (boot code) flash memory (note that the terminology used here, regarding "main BIOS flash memory" and "backup BIOS flash memory" are irrelevant, but are merely used to indicate that there are two different flash memories that are dedicated to storing boot code, or other types of data). These DualBIOS or TwinBIOS systems download the new boot code into the backup flash memory. Once the new boot code is fully downloaded and validated, then the computer system would either copy the new boot code into the main flash memory for the next boot cycle or would boot from the backup flash memory on the next boot cycle. With this architecture, the DualBIOS or TwinBIOS systems are also able to keep backup copies of the currently working boot code, so that in the event of corruption of the main boot code as a result of a virus, a power surge or a sudden power failure, the backup boot code can be executed at the next power cycle. Typically, the boot code in the main flash memory will be evaluated at boot up and if the boot code fails the evaluation, then the boot code will be executed from the backup flash memory.

These conventional systems require two separate flash memories to be dedicated to storing, updating and executing boot code. Real estate on motherboards of computer systems is a valuable commodity. Newer motherboards include on-board graphics processors, audio processors and many interfaces for additional peripherals, making space extremely tight. The use of two separate flash memories requires the use of additional real estate on motherboards. For example, the flash memories themselves take up space on the motherboard and they also require additional power lines, data lines, etc. Recently, the types of computer systems using boot code and requiring boot code updates are not just limited to personal or desktop computers, but they extend to wearable devices, set-top cable and satellite boxes, media center receivers, Internet-of-Things devices, home appliances, automotive components, servers, data centers, to name a few, where space constraints are of the utmost concern.

Therefore, it is desirable to provide a system that has the capabilities of a DualBIOS or TwinBIOS type system, without the necessity of two separate flash memories.

SUMMARY

In one aspect of the present technology a memory device is provided. The memory device described herein includes a non-volatile memory configured with a block having a first portion and a second portion, wherein the first portion is represented by a first range of physical addresses, and the second portion is represented by a second range of physical addresses. The memory device also includes an address decoder that maps received command addresses to physical addresses of the non-volatile memory, and includes control circuitry configured to maintain a current status indicating whether (i) the first portion of the non-volatile memory is a current area storing information and the second portion of the non-volatile memory is available for being updated with updated information or (ii) the first portion of the non-volatile memory is available for being updated with the updated information and the second portion of the non-volatile memory is the current area storing the information, and to implement an update operation. The update operation implemented by the control circuitry includes, responsive to receiving a write command sequence including a write command address of the block, causing the address decoder to (i) map the write command address to one of the first portion and the second portion, selected in response to the current status and (ii) update the selected one of the first portion and the second portion with the updated information, and includes upon completion of the updating of the selected one of the first portion and the second portion, changing the current status to indicate that the selected one of the first portion and the second portion is the current area storing the information and to indicate that the unselected one of the first portion and the second portion, is available for being updated with the updated information.

In another aspect of the present technology, a method of operating a memory device is provided. The method includes configuring a non-volatile memory of the memory device with a block having a first portion and a second portion, wherein: the first portion is represented by a first range of physical addresses; and the second portion is represented by a second range of physical addresses. In addition, the method includes mapping received command addresses to physical addresses of the non-volatile memory, and maintaining a current status indicating whether (i) the first portion of the non-volatile memory is a current area storing information and the second portion of the non-volatile memory is available for being updated with updated information or (ii) the first portion of the non-volatile memory is available for being updated with the updated information and the second portion of the non-volatile memory is the current area storing the information. The method also includes implementing an update operation including being responsive to receiving a write command sequence of the block, causing the address decoder to (i) map the write command address to one of the first portion and the second portion, selected in response to the current status and (ii) update the selected one of the first portion and the second portion with the updated information, and upon completion of the mapping and updating of the selected one of the first portion and the second portion, changing the current status to indicate that the selected one of the first portion and the second portion is the current area storing the information and to indicate that the unselected one of the first portion and the second portion is available for being updated with the updated information.

In another aspect of the present technology, a method of manufacturing a memory device is provided. The method includes providing a non-volatile memory configured with a block having a first portion and a second portion, wherein the first portion is represented by a first range of physical addresses, and the second portion is represented by a second range of physical addresses. The method also includes providing and configuring an address decoder that maps received command addresses to physical addresses of the non-volatile memory. The method further includes providing control circuitry configured to maintain a current status indicating whether (i) the first portion of the non-volatile memory is a current area storing information and the second portion of the non-volatile memory is available for being updated with updated information or (ii) the first portion of the non-volatile memory is available for being updated with the updated information and the second portion of the non-volatile memory is the current area storing the information, and to implement an update operation. The update operation implemented by the control circuitry includes, responsive to receiving a write command sequence including a write command address of the block, causing the address decoder to (i) map the write command address to one of the first portion and the second portion, selected in response to the current status and (ii) update the selected one of the first portion and the second portion with the updated information, and includes upon completion of the updating of the selected one of the first portion and the second portion, changing the current status to indicate that the selected one of the first portion and the second portion is the current area storing the information and to indicate that the unselected one of the first portion and the second portion, is available for being updated with the updated information.

Other aspects and advantages of the present invention can be seen on review of the drawings, the detailed description and the claims, which follow.

DETAILED DESCRIPTION

A detailed description of embodiments of the present invention is provided with reference to the FIGS. 1-6.

Figure 1:
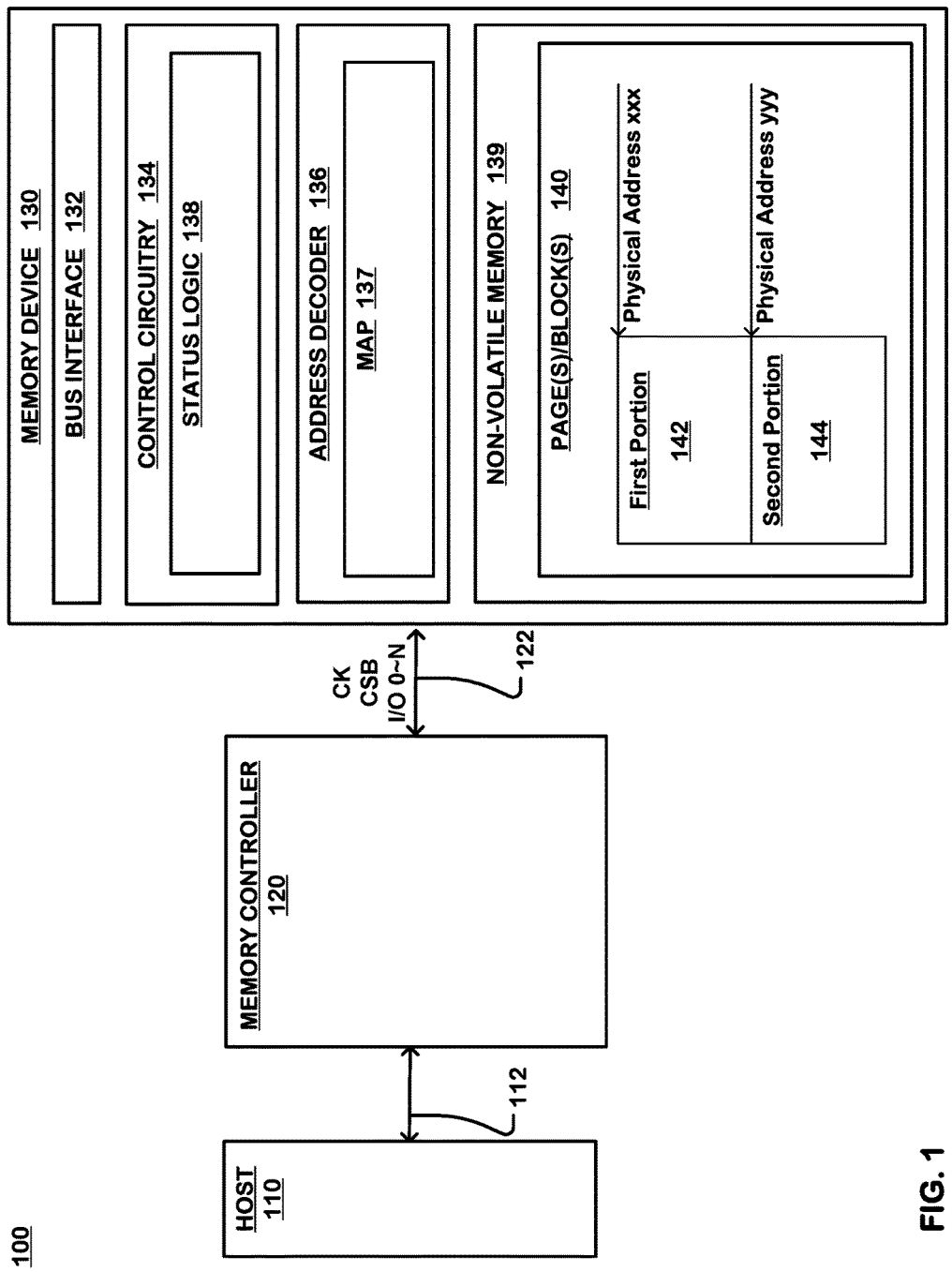
FIG. 1 illustrates a functional block diagram of a system including a host, a memory controller and a memory device configured to implement an update operation.

FIG. 1 illustrates a functional block diagram of a system including a host, a memory controller and a memory device configured to implement an update operation.

Specifically, FIG. 1 illustrates a simplified functional block diagram of a system 100, which comprises a host 110, a communication bus 112, a memory controller 120, a communication bus 122 and a memory device 130. In system 100, the host 110 executes programs that read and write data using logical addresses. The host 110 communicates across the communication bus 112 to the memory controller 120 and the memory controller 120 communicates across the communication bus 122 to the memory device 130.

The host 110, for example, can be a computer system running an operating system that delivers requests (e.g., write and read) to the memory controller 120 through the communication bus 112.

The communication bus 112 between the host 110 and the memory controller 120 can be, for example, a peripheral component interconnect (PCI) bus, a peripheral component interconnect express (PCIe) bus, a serial ATA (SATA), and any other type of bus that communicates using appropriate communication protocols.

The memory controller 120 can be implemented using software or other logic structures in a microcontroller unit (MCU) or a dedicated memory controller chip. In other embodiments, the host 110 and memory controller 120 can be implemented on a single processor, or the host 110 and memory controller 120 can comprise parts of a complex data processing system. The memory controller 120 can act as an interface between the host 110 and the memory device 130. One function of the memory controller 120 is to translate higher-level read and write requests into the command language of the particular memory device 130 that can be used to access non-volatile memory 139 included on the memory device 130. The memory controller 120 may include an interface layer (not illustrated) that is responsible for composing command sequences for performing read and write operations to and from the memory device 130, in a manner that is compatible with the memory device 130 and the non-volatile memory 139. The command sequences can be composed by translating logical addresses received from the host 110 into physical addresses for the memory device 130.

The memory controller 120 is connected to the memory device 130 by the communication bus 122. For the purpose of this description, the communication bus 122 can be a communication system that transfers data between nodes of the memory controller 120 and the memory device 130. The communication bus 122 can include bus lines (e.g., physical layer connections like wires, optical fiber, wireless links, etc.), connected to the memory controller 120 and the memory device 130.

For example, the memory controller 120 can use a bus structure having a plurality of bus lines I/O 0~N, along with a chip select line (CSB) (active low or active high) and a clock line (CK). The communication bus 122 can comprise a serial peripheral interface (SPI) bus or other synchronous serial communication interface characterized by a synchronous clock line, a chip select line and one or more data lines synchronized with a synchronous clock on the synchronous clock line. SPI devices typically use a four-wire synchronous serial communication protocol, which can communicate in full duplex mode (CK, CSB, master in/slave out (MISO), master out/slave in (MOST)).

The memory device 130 includes a bus interface 132, control circuitry 134, an address decoder 136, and non-volatile memory 139. The non-volatile memory 139 of the memory device can be a single-bit-per-cell or multiple-bit-per-cell NOR non-volatile flash memory device. In other examples, the non-volatile memory 139 can comprise other types of non-volatile memory devices, including single-bit-per-cell or multiple-bit-per-cell NAND flash, phase change memory, magnetic memory, metal oxide programmable resistance memory and so on.

Further, portions of the non-volatile memory 139 can be configured with one or more pages and blocks 140 to which read and write operations are performed. For example, as illustrated in FIG. 1, pages and blocks 140 of the non-volatile memory 139 can include a first portion 142 and a second portion 144. The first portion 142 and the second portion 144 can represent areas of the non-volatile memory 139. For example, the first portion 142 can represent a continuous range of physical addresses starting from a certain address xxx (e.g., address 000000h) and the second portion 144 can represent another continuous range of addresses starting from a certain address yyy (e.g., address 800000h). The second portion 144 can start at the next physical address immediately following the end of the first portion 142 or there can be extra space allocated between the first portion 142 and the second portion 144, which could be reserved for other uses or could be reserved for expanding the range of the first portion 142 and/or the second portion 144.

The non-volatile memory 139 can further include third and fourth portions (not illustrated), etc. As discussed below with reference to FIG. 2, the first portion 142 and the second portion 144 can act as a set, where information is read from one of the two portions until updated information is completely written (and optionally verified) to the other of the two portions and then the information can be read from the portion that has the updated information, where the other portion that has the now older information can be used for having the next update written thereto. The "updated information" can be just a change of one or more lines in code or a complete replacement of the code in its entirety. This is essentially ping-ponging between the two portions of the non-volatile memory 139. The third and fourth portions, mentioned above but not illustrated, can also be used in the same way as the first portion 142 and the second portion 144. One implementation could require each portion of the "set" (e.g., the first portion 142 and the second portion 144) to be on different banks (not illustrated) of the non-volatile memory 139. Another implementation could have each portion of the "set" on the same bank of the non-volatile memory 139. These "sets" of portions can be configured or designated by logic on the memory device 130, such as a map or control circuitry.

The address decoder 136 of the memory device 130 includes a map 137 and the control circuitry 134 includes status logic 138. The map 137 maps command addresses (e.g., read command addresses and write command addresses) received on the bus interface 132 from the memory controller 120 to physical addresses of the non-volatile memory 139. The status logic 138 can be used to indicate to the map 137 which portion (e.g., the first portion 142 or the second portion 144) of a set is to be read from and written to. In an implementation, the map 137 can act as a multiplexer that responds to a status bit (e.g., a current status bit that indicates a certain status of the system 100) that is output by the status logic 138 to determine which portion of the set of portions is to be read from and which portion of the set of portions is to be written to. The control circuitry 134 and/or the status logic 138 can also indicate which mode the memory device 130 is operating in. For example, the control circuitry 134 and/or the status logic 138 can determine and indicate that the memory device 130 is operating in a normal mode or a dual-area update mode in which both the first portion 142 and the second portion 144 are used for storing and updating code (e.g. boot code).

The status logic 138 does not need to be entirely located on the control circuitry 134. For example, a portion of the status logic 138 can be located elsewhere on the memory device 130, as well as the status bits used by the status logic 138. This illustration of the memory device 130 is only for the purpose of showing the different elements of and functions performed by the memory device 130 and the various operations and information described below can be stored and implemented on different parts of the memory device 130, as well as the entire system 100.

The control circuitry 134, which includes status logic 138, accesses the non-volatile memory 139, executes memory read and write operations and maintains a current status that is used to determine which portion (e.g., the first portion 142 or the second portion 144) of each of the sets of portions of the non-volatile memory 139 should be used/accessed. This current status is what allows the map 137 to determine (map) which portion of the set of portions should be written to, and allows the map 137 to determine (map) which portion of the set of portions should be read from.

In an implementation where the first portion 142 and the second portion 144 are used to store the BIOS or boot code, current status can be used by the status logic 138 to direct a writing operation to write updated BIOS or boot code to one portion of the non-volatile memory 139, such that the system 100 will not "boot up" from the portion of the non-volatile memory 139 having the updated code until the updating is complete and verified. Then at the next "boot up" (i.e., after the updating is complete and verified) the status will be updated and the status logic 138 in combination with the map 137 will cause the system 100 to boot from the portion of the non-volatile memory 139 having the updated code. These operations are described in more detail with reference to FIGS. 2-5C.

The control circuitry 134 also decodes the command sequences received on the bus interface 132 from the memory controller 120. These command sequences can include corresponding operation codes, such as read, write, erase, etc., the command addresses and/or data, such as the data to be written to the non-volatile memory 139. The control circuitry 134 executes operations that are identified in the received command sequences and also implements, at least in part, the logic for performing an updating operation of updating code on the non-volatile memory 139, such as BIOS or boot code.

For example, the updating operation can be performed when the control circuitry 134 receives a first command sequence that includes a write command to write/update data (e.g., update data X) and a write command address and when the control circuitry 134 receives a second command sequence that includes a read command to read data (e.g., data X). The pages/blocks 140 of the non-volatile memory 139 are configured with the addresses for performing reading and writing. The configuration of the read and write addresses can be set up using logic on the memory device 130. For example, the read command address can be designated by the map 137 of the memory device 130 for reading the data. In terms of BIOS or boot code, the non-volatile memory 139 can include a boot block that includes the first portion 142 and the second portion 144, and the read command address can be configured to always read data from a particular address of the boot block. Similarly, the write command address can be configured to write to a particular address of the boot block. Alternatively, the memory controller 120 can be configured to assign (pre-configure) the read command addresses and the write command addresses to certain operations based, in part, on logic contained thereon and/or based on a configuration or logic of the operating system of the host 110.

This update operation of updating the data stored on the non-volatile memory 139 can be performed because the read command address received from the memory controller 120 is mapped by the address decoder 136 to, for example, the first portion 142 of the non-volatile memory 139. However, in contrast, the write command address received from the memory controller 120 is mapped by the address decoder 136 to, for example, the second portion 144 of the non-volatile memory 139. For example, a read operation of reading boot code from the first portion 142 of the non-volatile memory 139 can be used during a "boot up" of the system 100 and the write command for updating the boot code proceeds to write the updated boot code to the second portion 144 of the non-volatile memory 139. Once the writing operation is fully complete, for example, the system 100 will "boot up" using the updated boot code or BIOS by reading from the second portion 144 of the non-volatile memory 139. This process can continue by continuing to flip-flop between the first portion 142 and the second portion 144 every time the boot code or BIOS is updated (e.g., new boot code is written and verified).

This update operation requires, after the updating of the data is complete and verified, the memory device 130 to update the status that causes the address decoder 136 to properly map the reading (e.g., the system boot up) and the writing (e.g., the updating of the BIOS or boot code) to the appropriate portions (e.g., the first portion 142 and the second portion 144). In other words, the combination of the address decoder 136 and the control circuitry 134 implements the operation that switches the portions of the non-volatile memory 139 that are mapped to the read command addresses and the write command addresses.

Figure 2:
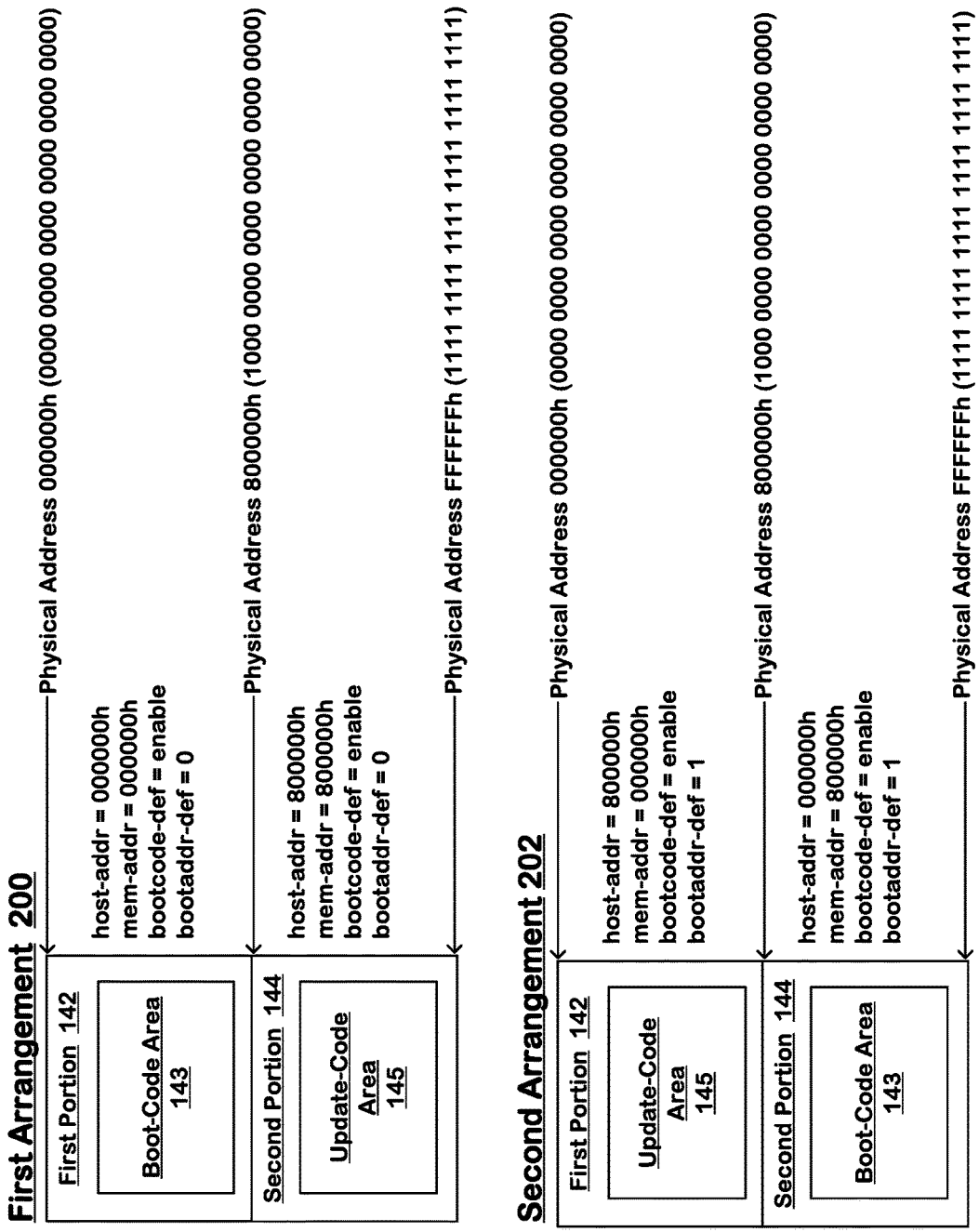
FIG. 2 provides a functional block diagram illustrating first and second arrangements for updating first and second portions of a non-volatile memory of a memory device according to an update operation.

FIG. 2 provides a functional block diagram illustrating first and second arrangements for updating first and second portions of a non-volatile memory of a memory device according to an update operation.

Specifically, FIG. 2 illustrates a first arrangement 200 and a second arrangement 202. According to the first arrangement 200, the first portion 142 of the non-volatile memory 139 of FIG. 1 is configured to store data (e.g., boot code) to be read during, for example a "boot up" and where the second portion 144 of the non-volatile memory 139 is configured to have updated data (e.g., updated boot code) written thereto. In the example illustrated in FIG. 2, the first portion 142 and the second portion 144 can be configured to store BIOS or boot code. According to the first arrangement 200, the first portion 142 contains a boot-code area 143 that stores the boot code that is used during the "boot up" and the second portion 144 contains an update code area 145 that is for having the updated boot code written thereto. This is only an example implementation of the present technology and should not be limited to just BIOS or boot code. The boot-code area 143 could also be referred to as a "current-code area" indicating that it stores a current version of code, and the update-code area 145 is for storing an updated version of the code stored in the "current-code area."

In the example implementation illustrated in FIG. 2 with respect to the first arrangement 200, the starting address of the non-volatile memory 139 designated for the first portion 142 begins at physical address 000000h (hex) (i.e., 0000 0000 0000 0000 0000 0000 in binary) and the starting address of the non-volatile memory 139 designated for the second portion 144 begins at physical address 800000h (i.e., 1000 0000 0000 0000 0000 0000 in binary). The ending address of the portion of the non-volatile memory 139 that is designated to be used for the first and/or second portions 142 and 144 can be physical address FFFFFFh (i.e., 1111 1111 1111 1111 1111 1111 in binary).

Further, according to the first arrangement 200, when the host performs a read operation to read, for example, boot code from the non-volatile memory 139, from address 000000h it will be directed to physical address 000000h. Also, according to the first arrangement 200, when the host performs a write operation to write, for example, updated boot code to the non-volatile memory 139, to address 800000h it will be directed to physical address 800000h.

FIG. 2 also illustrates that the variable bootcode-def (bit) indicates "enable." The bootcode-def can either indicate "enable" or "disable." When bootcode-def indicates "enable," the memory device 130 (FIG. 1) is in a dual-area update mode (e.g., "dual mode" for short) that allows the BIOS or boot code to be updated while continuing to use the current boot code. In other words, when the bootcode-def indicates "enable" the first arrangement 200 and the second arrangement 202 are both used for reading/writing data (boot code). If bootcode-def indicates "disable" then memory device 130 will operate in a conventional mode, meaning that both the first arrangement 200 and the second arrangement 202 will not be used (i.e., the "dual mode" is disabled). In other words, the bootcode-def variable simply turns on and off the "dual-area update mode" implemented by the present technology. Bootcode-def can be user configurable and the value of bootcode-def can be stored in a non-volatile memory register (not illustrated) such as critical memory. The control circuitry 134 and the status logic 138 of FIG. 1 operate according to the value of bootcode-def. The nomenclature of "bootcode-def" is only an example and is for the purpose of indicating that a variable is used by the memory device 130 for determining whether or not to operate using conventional operations or to operate using the ping-ponging update operation. Any other naming convention could be used.

Additionally, according to the first arrangement 200, the variable bootaddr-def equals 0. This can represent that the first portion 142 and the second portion 144 are utilized according to a first configuration. In this example, when bootaddr-def equals 0 (i.e., the first configuration) the code (boot code) to be read during "boot up" is stored starting from the lowest address of the non-volatile memory 139 designated for the boot code. This first configuration can also indicate that the code is stored starting from the highest address of the non-volatile memory 139 (or of a block of the non-volatile memory 139) or the highest address of a particular block of the non-volatile memory 139, or any other type of configuration. The bootaddr-def can be user configurable and can be stored in a non-volatile memory register (not illustrated). The control circuitry 134 and the status logic 138 of FIG. 1 operate according to the value of bootaddr-def. Again, the nomenclature of "bootaddr-def" is only an example and is for the purpose of indicating which portion of the non-volatile memory 139 is designated for storing the current code to be read and which portion of the non-volatile memory 139 is designated for having the updated code written thereto.

In the first arrangement 200, when the host attempts to read the current code from address 000000h (i.e., "host-addr=000000h") the memory device 130 reads the current code from physical address 000000h (i.e., "mem-addr=000000h") and when the host attempts to write the updated code to address 800000h (i.e., "host-addr=800000h") the memory device writes the updated code starting at address 800000h (i.e., "mem-addr=800000h").

According to the second arrangement 202, the second portion 144 of the non-volatile memory 139 is configured to store the data (e.g., boot code) to be read during, for example, the "boot up" and the first portion 142 of the non-volatile memory 139 is configured to have the updated data (e.g., updated boot code) written thereto. Additionally, the second arrangement 202 is implemented by the memory device 130 when "bootcode-def=enable" and when "bootaddr-def=1." Specifically, in the second arrangement 202, the variable bootaddr-def equals 1, which can represent that the first portion 142 and the second portion 144 are utilized according to a second configuration. In this example, when bootaddr-def equals 1 (i.e., the second configuration) the code (boot code) to be read during "boot up" is stored starting at a physical address other than the lowest address of the non-volatile memory 139 (e.g., physical address 800000h, as opposed to physical address 000000h as in the first arrangement 200 (first configuration)).

As illustrated in FIG. 2, according to the second arrangement 202, when the host attempts to read the current code from address 000000h (i.e., "host-addr=000000h") the memory device 130 reads the current code from physical address 800000h (i.e., "mem-addr=800000h") and when the host attempts to write the updated code to address 800000h (i.e., "host-addr=800000h") the memory device 130 writes the updated code starting at address 000000h (i.e., "mem-addr=000000h").

Furthermore, referring to FIG. 2, in the first arrangement 200 the binary address of the beginning of the first portion 142 (the boot-code area 143) is 0000 0000 0000 0000 0000 0000 and in the second arrangement 202 the binary address of the beginning of the second portion 144 (the boot-code area 143) is 1000 0000 0000 0000 0000 0000. Accordingly, the physical address of the boot-code area 143 can be changed, depending on the arrangement being implemented, by simply flipping the most significant bit of the address. As described in more detail with reference to FIG. 3, the value assigned to the bootaddr-def can cause the control circuitry 134 and the status logic 138 to flip the most significant bit of the physical memory address so that the code is read from the appropriate area of the non-volatile memory 139, and so that the code is updated (written) to the appropriate area of the non-volatile memory 139.

Figure 3:
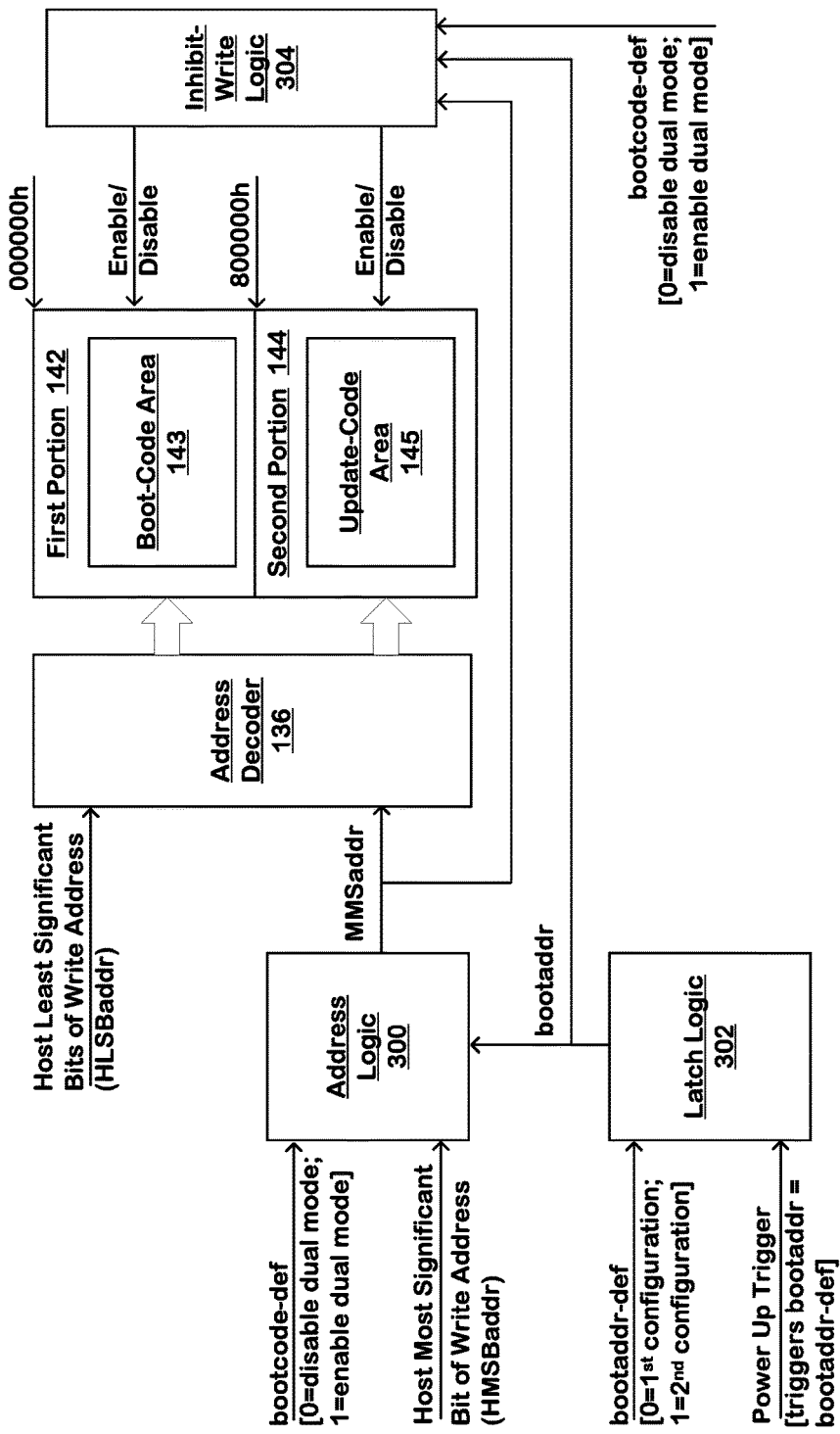
FIG. 3 illustrates a functional block diagram of portions of the system of FIG. 1.

FIG. 3 illustrates a functional block diagram of portions of the system of FIG. 1.

Specifically, FIG. 3 illustrates portions of the control circuitry 134, the address decoder 136 and the non-volatile memory 139 of the system 100 of FIG. 1. Referring to FIG. 3, the system 100 can include address logic 300 and latch logic 302. Both the address logic 300 and the latch logic 302 are part of the status logic 138 of the control circuitry 134, as illustrated in FIG. 1.

The value of bootaddr-def, which can be stored in a non-volatile memory register as discussed above with reference to FIG. 2, is received by the latch logic 302. As previously described, the variable bootaddr-def can indicate "1" or "0" which indicates that the system 100 operates using a first configuration or a second configuration. The first configuration can indicate that the first arrangement 200 of FIG. 2 is implemented and the second configuration can indicate that the second arrangement 202 of FIG. 2 is implemented.

The latch logic 302 also receives a power up trigger every time the system 100 "boots up." When the latch logic 302 receives the power up trigger it sets the variable bootaddr to equal the value of bootaddr-def. For example, during operation of the system 100, the value of bootaddr-def could change from "1" to "0" or from "0" to "1." However, the value of bootaddr will not change until the system 100 reboots and the power up trigger causes the latch logic 302 to set bootaddr to equal the value of bootaddr-def. As a result, the system 100 can continue to operate using the first arrangement 200 until the system 100 reboots. After the reboot, the system 100 could then operate using the second arrangement 202. In other words, it is not just the changing of the bootaddr-def that causes the bootaddr to change. It is both (i) the changing of the bootaddr-def and (ii) the reboot of the system 100 (i.e., the power up trigger) that will cause the value of bootaddr to change.

The address logic 300, as illustrated in FIG. 3, obtains the value of the variable bootcode-def as well as the most significant bit of a write address of a write command. The variable bootcode-def is described above with reference to FIG. 2. Essentially, bootcode-def indicates whether "dual-area update mode" (i.e., dual mode) is enabled or disabled. If the "dual mode" is disabled, then the system 100 will operate in a conventional manner and if it is enabled, then the system 100 will operate using the two different arrangements illustrated in FIG. 2. The value of bootcode-def can be "0" or "1." FIG. 3 illustrates that "0" means that dual mode is disabled and "1" means that dual mode is enabled. This is only an example and the meanings of the values can be switched.

The "host most significant bit of write address," (or read address) as obtained by the address logic 300 is simply the most significant bit of a write address (or read address) identified by a host write (or read) command. This is the most significant bit of the address that the host is attempting to write to. In this example, FIG. 3 identifies the host most significant bit of write address as "HMSBaddr." The address logic 300 also receives the value of the bootaddr as determined by the latch logic 302. The operation of the address logic 300 is described below.

When bootcode-def indicates disable, (i) the variable "MMSaddr," as output by the address logic 300 equals HMSBaddr and (ii) the variables bootaddr and inhibit-write are ignored or provide no function. When bootcode-def indicates enable, (i) the variable MMSaddr equals HMSBaddr, when bootaddr-def equals "0" (note that bootaddr=bootaddr-def after a new power-up cycle or reboot) and (ii) the variable MMSaddr is equal to the inverted value of HMSBaddr, when bootaddr-def equals "1" (note that bootaddr=bootaddr-def after a new power-up cycle or reboot).

The address decoder 136 receives the MMSaddr provided by the address logic 300 as well as the remaining portion of the host write address (i.e., "Host Least Significant Bits of Write Address" or "HLSBaddr"). The address decoder then combines the MMSaddr with the HLSBaddr and then utilizes the map 137, as illustrated in FIG. 1, to identify which physical address of the non-volatile memory 139 should be accessed. For example, if the host issues a write command to address 000000h (i.e., 0000 0000 0000 0000 0000 0000), when bootcode-def indicates enable and bootaddr indicates 1, the address logic 300 will flip (invert) the most significant bit of the issued write command from "0" to "1" which is represented by MMSaddr and will then combine MMSaddr, which now has a value of "1" with the value of HLSBaddr, which has a value of "000 0000 0000 0000 0000 0000). The resulting value is "1000 0000 0000 0000 0000 0000," which is then used by the map 137 to locate the corresponding physical address. Essentially, the address logic 300 and the latch logic 302 cause the address decoder 136 to utilize an arrangement so that the updated boot code is written to a different location than the current boot code (e.g., second arrangement 202 from FIG. 2). In this example, the writing of the updated code is performed at the second portion 144 (the update-code area 145) starting at address 800000h (i.e., 1000 0000 0000 0000 0000 0000). The same operations are performed for reading code from the non-volatile memory 139. The control circuitry 134 is able to determine whether a command is a read command or a write command and then direct the read to the appropriate portion. Parameters can be stored by the control circuitry 134 and/or a state machine to differentiate the logic for read commands and write commands. In this example, the current code would be read from the first portion 142 (the boot-code area 143) starting at address 000000h.

In order to add a layer of security, inhibit-write logic 304 is implemented to prevent the boot-code area 143 from being overwritten or erased before the code on the update-code area 145 is completely updated and verified. The inhibit-write logic 304 receives (i) the bootaddr from the latch logic 302, (ii) the MMSaddr from the address logic 300 and (iii) the bootcode-def. Based on these inputs the inhibit-write logic 304 either enables or disables an inhibit-write for the boot-code area 143 and the update-code area 145. Specifically, when bootcode-def=0, such that the dual mode is disabled, the inhibit-write and bootaddr provide no function. However, when bootcode-def=1, such that the dual mode is enabled, the inhibit-write logic 304 determines whether to enable or disable the inhibit-write (i.e., inhibit-write=1 or inhibit-write=0). For example, the inhibit-write logic 304 can act as an XNOR gate with the values of "bootaddr" and "MMSaddr" as the inputs and the value of the inhibit-write as the output. Therefore, when the inhibit-write logic 304 implements an XNOR gate, the inhibit-write will be enabled (e.g., have a value of "1") when both "bootaddr" and "MMSaddr" have the same values, such as "0" and "0" or such as "1" and "1". Otherwise, inhibit-write will be disabled when "bootaddr" and "MMSaddr" have different values, such as "1" and "0," respectively or "0" and "1," respectively. This is just an example of the logic implemented by the inhibit-write logic 304, and other types of logic will be apparent to those skilled in the art. When the variable inhibit-write is enabled (e.g., inhibit-write=1) for the boot-code area 143, the boot-code area 143 cannot be written to. In other words, the physical addresses of the non-volatile memory 139 storing the current boot code are set as "read only" so that the current boot code cannot be overwritten. In contrast, when the variable inhibit-write is disabled (e.g., inhibit-write=0) for the update-code area 145, the update-code area 145 is not "read only" but can be written to and can be erased.

The values of the variables bootaddr and inhibit-write are not user configurable, and can only be set by the system 100 or the logic thereof. Further, these values can be stored in volatile or non-volatile memory.

Figure 4:
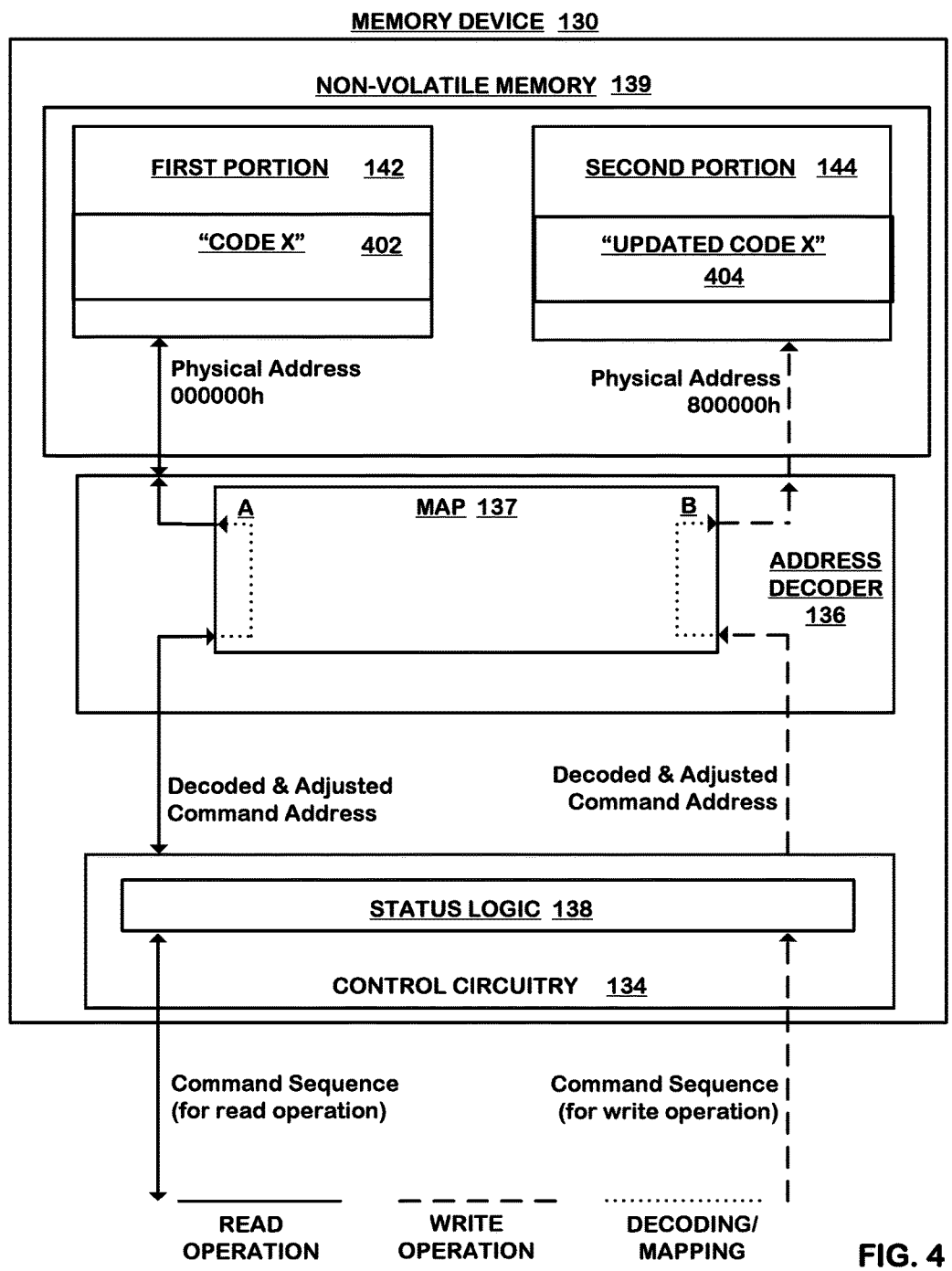
FIG. 4 illustrates a functional block diagram of a memory device that operates in a "dual-area update mode".

FIG. 4 illustrates a functional block diagram of a memory device that operates in a dual-area update mode (i.e., dual mode). Specifically, FIG. 4 illustrates a memory device 130 that includes control circuitry 134, status logic 138, an address decoder 136 having a map 137, and non-volatile memory 139. The non-volatile memory 139 can include pages/blocks (not illustrated, see FIG. 1) that include a first portion 142 and a second portion 144. The operation of the memory device 130 of FIG. 4 is similar to that of the memory device 130 of FIG. 1 and is also similar to that described with reference to FIG. 3. Therefore, some redundant descriptions thereof are omitted.

The address decoder 136 of the memory device 130 performs the mapping between the read/write command addresses issued by the host and the physical addresses of the non-volatile memory 139 based, in part, on the status logic 138. Further, as illustrated by FIG. 4, command sequences for performing read and write operations are received from a memory controller (not illustrated). A representative path for an example read operation is represented by a solid line, a representative path for an example write operation is represented by a dashed line and representative paths for the mapping performed by the map 137 of the address decoder 136 are represented by dotted lines.

As mentioned above, the non-volatile memory 139 of the memory device 130 can include a first portion 142 starting at, for example, physical address 000000h and can include a second portion 144 starting at, for example, physical address 800000h. Unlike the logical addresses that are referenced by a host (not illustrated) or by software running on the host, these first and second portions 142 and 144 are located on physical pages/blocks on the non-volatile memory 139.

The control circuitry 134 of the memory device 130 can decode the received command sequences that include operation codes, such as read, write, erase, etc., command addresses, data, as well as other information, as received from a memory controller. Based on the received command sequences, the control circuitry 134 will output decoded and adjusted command addresses. Specifically, the received command sequences can include a read command address that is pre-configured by the map 137 of the address decoder 136 for reading data from a specific portion (e.g., a specific set of pages) of the non-volatile memory 139 and can include a write command address that is pre-configured by the map 137 of the address decoder 136 for writing data to a specific portion (e.g., specific set of pages) of the non-volatile memory 139.

The status logic 138 of the control circuitry 134 includes logic that performs the operations of the address logic 300, the latch logic 302 as well as the inhibit-write logic 304, as described with reference to FIG. 3. Specifically, the status logic 138 includes logic that maintains a current status indicating whether (i) the first portion 142 of the non-volatile memory 139 is a current area (e.g., a boot-code area 143) storing information and the second portion 144 of the non-volatile memory 139 is available (e.g., an update code area 145) for being updated with updated information or (ii) the second portion 144 of the non-volatile memory 139 is a current area (e.g., a boot-code area 143) storing information and the first portion 142 of the non-volatile memory 139 is available (e.g., an update code area 145) for being updated with updated information.

The control circuitry 134 receives the command sequences from the host and obtains the values of the variables described with reference to FIG. 3 (e.g., bootcode-def, HMSBaddr, HLSBaddr, bootaddr-def, power up trigger, etc). The control circuitry 134 decodes the command sequences and provides decoded commands and command addresses to the address decoder 136, as explained in further detail with reference to FIG. 3. The map 137 of the address decoder 136 can map (dotted lines) the read command address to the appropriate portion of the non-volatile memory 139. The map 137 can also map the write command address to the appropriate portion of the non-volatile memory 139.

Specifically, the map 137 and the status logic 138 can be implemented to map the read command address to the appropriate portion of the non-volatile memory 139 (e.g., the first portion 142 and/or the second portion 144). The map 137 and the status logic 138 can also be implemented to map the write command address to the appropriate portion (e.g., the first portion 142 and/or the second portion 144). The map 137 of the address decoder 136 can be a simple table or something more complex. Further, the map 137 can be implemented so that it only maps addresses configured for writing/reading to/from portions or the sets of portions for performing or operating in the dual-area update mode. As described with reference to FIG. 3, the status logic 138 indicates, to the map 137 and/or address decoder 136, which physical address (e.g., which of two different physical address that represent the beginning of the first portion 142 and the second portion 144) should be selected for a read operation and which physical address should be selected for a write operation. This indication by the status logic 138 is based on the statuses of the variables obtained and set by, for example, the address logic 300, the latch logic 302 and the inhibit-write logic 304 as described with reference to FIG. 3.

In the implementation illustrated in FIG. 4, the map 137 of the address decoder 136 provides a translation (mapping) between (i) decoded and adjusted read command address for reading data from a portion or portions of the non-volatile memory 139 (the read command address is included in the command sequence received from the memory controller) and (ii) physical addresses of the first portion 142 of the non-volatile memory 139 and the second portion 144 of the non-volatile memory 139. Similarly, the map 137 of the address decoder 136 provides a translation (mapping) between (i) the decoded and adjusted write command addresses for writing data to a portion or portions of the non-volatile memory 139 (the write command address is included in the command sequence received from the memory controller) and (ii) physical addresses of the first portion 142 of the non-volatile memory 139 and the second portion 144 of the non-volatile memory 139.

As mentioned above, the first portion 142 and the second portion 144 can be configured as a set of portions of the non-volatile memory 139. In this implementation, the map 137 of the address decoder 136 is capable of mapping the decoded and adjusted read command address received from the control circuitry 134 to the first portion 142 of the set of portions, and is capable of mapping the decoded and adjusted write command address to the second portion 144 of the set of portions. As discussed above with reference to FIG. 3, the status logic 138 is able to, based on the status of the variables and based on the host command address, control which portion of the set of portions should be read from and which portion of the set of portions is to be written to based on the current status that is maintained by, for example, the control circuitry 134. Note that the status logic 138 and the control circuitry 134 can perform these same functions for more than just one set of portions. Based on the current status maintained by the status logic 138, the map 137 can (i) read current code from the boot-code area 143, when the boot-code area 143 is in the first portion 142 according to the first arrangement 200 of FIG. 2 and when the boot-code area 143 is in the second portion 144 according to the second arrangement 202 and (ii) write updated code to the update-code area 145, when the update-code area 145 is in the second portion 144 according to the first arrangement 200 of FIG. 2 and when the update-code area 145 is in the first portion 142 according to the second arrangement 202.

For example, if the current status indicates that the first portion 142 of the non-volatile memory 139 is the current area storing information and the second portion 144 of the non-volatile memory 139 is available for being updated with updated information, then the combination of the control circuitry 134 and the address decoder 136 will decode, adjust and map a read command sequence to the first portion 142 and will decode, adjust and map a write sequence to the second portion 144. In contrast, if the current status indicates that the first portion 142 of the non-volatile memory 139 is available for being updated with updated information and that the second portion 144 of the non-volatile memory 139 is the current area storing information, then the combination of the control circuitry 134 and the address decoder 136 will decode, adjust and map a read command sequence to the second portion 144 and will decode, adjust and map a write command sequence to the first portion 142.

Additionally, the control circuitry 134 can also keep the address decoder 136 updated so that the correct command sequence (host) addresses are mapped to the correct physical addresses of the non-volatile memory 139.

When the read operation is mapped to, for example, the first portion 142, the read operation will proceed to read the data from the first portion 142 back through the memory controller and eventually to the host and the software running on the host. Various timing, buffering and caching mechanisms (not illustrated) are typically implemented to assist in the transmission of the read request to the memory device 130 and the transmission of the read data from the memory device 130, through the controller, and ultimately to the host (operating system). Those skilled in the art will understand the various timing, buffering and caching mechanisms necessary to complete this read operation.

Referring to FIG. 4, an example of a read operation that reads "code x" 402 from the first portion 142 of the memory device 130 and an example of a write operation that writes "updated code x" 404 to the second portion 144 of the memory device 130 are provided. Specifically, FIG. 4 illustrates that a command sequence to read "code x" has been received from the host/controller, and that a command sequence to update "code x" has been received from the host/controller. As described in the background section of this application, conventional memory systems implement a two physical memory chips for storing boot code or a BIOS. However, because of the unique structure provided by this "dual-area update mode" the write operation can update "code x" and the current "code x" 402 can be read from the same non-volatile memory 139 of the memory device 130. Only after the "updated code x" is completely stored and verified, will the system read the updated code from the memory device 130 after a reboot. This can be achieved because the read command address is decoded and adjusted by the control circuitry 134 and is mapped by the address decoder 136 to the appropriate portion (e.g., the first portion 142 in FIG. 4), which is different from the portion to which the "updated code x" 404 is written. Accordingly, the "new" or "updated" version of "code x" can be written without risking vulnerability of the "code x" 402.

After "updated code x" 404 resides on the second portion 144 of the non-volatile memory 139, the present technology can verify that the "updated code x" 404 is complete and accurate. Once this is accomplished, the variable "bootaddr-def" can be changed/updated, so that on the next reboot the power up trigger will cause the latch logic 302 to update the value of "bootaddr" to match the updated/changed "bootaddr-def." As a result, the updated boot code or the BIOS will be read from the second portion 144 during boot up. The various operations performed by the memory device 130 to verify the updated code and the carry out the procedures of the "dual-area update mode" are described in more detail with reference to FIGS. 5A, 5B and 5C.

Figure 5A:
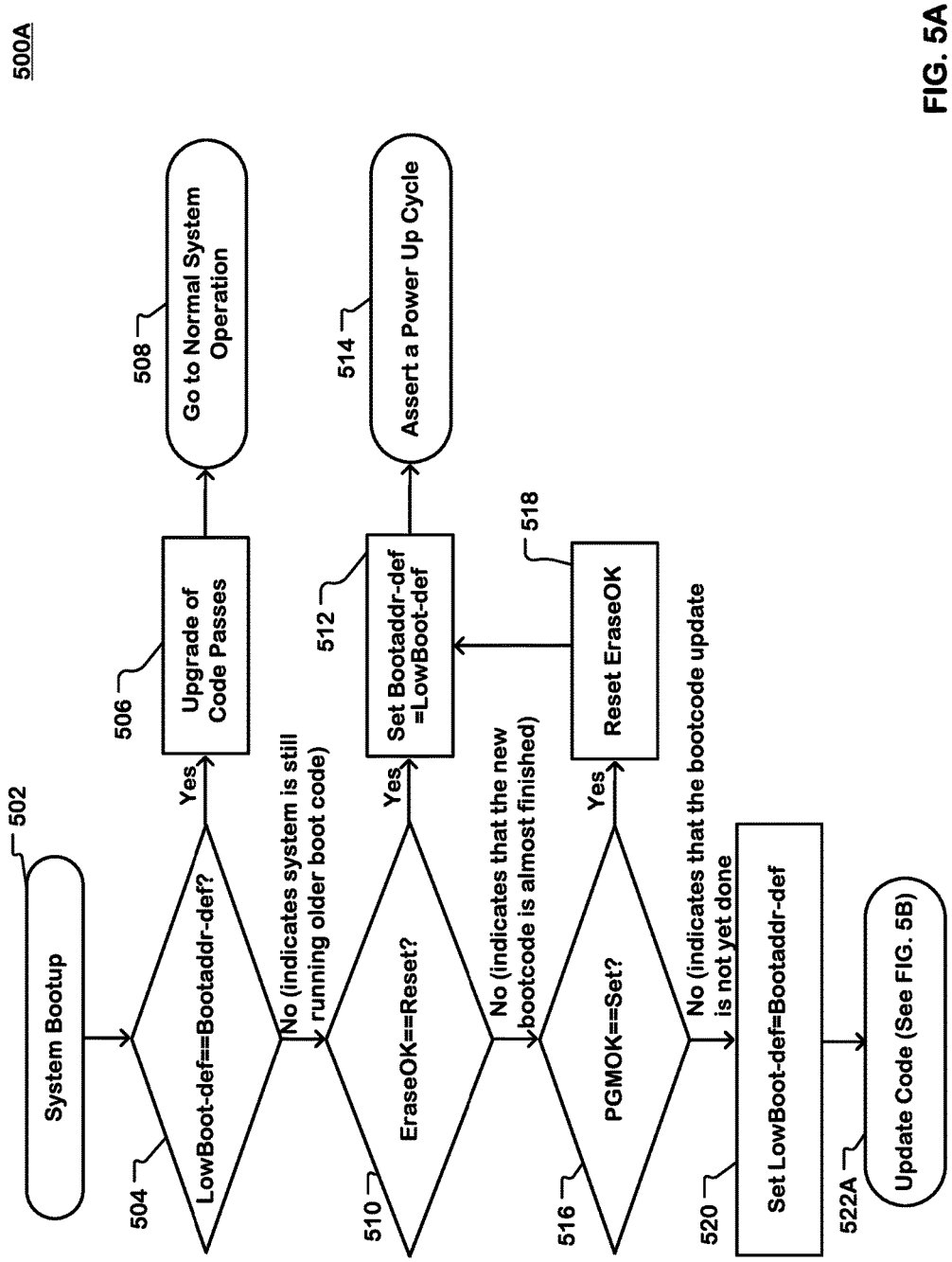
FIGS. 5A, 5B and 5C illustrate flow charts including the various operations that are performed in order to perform the update operation when the system is operating in the "dual-area update mode".
Figure 5B:
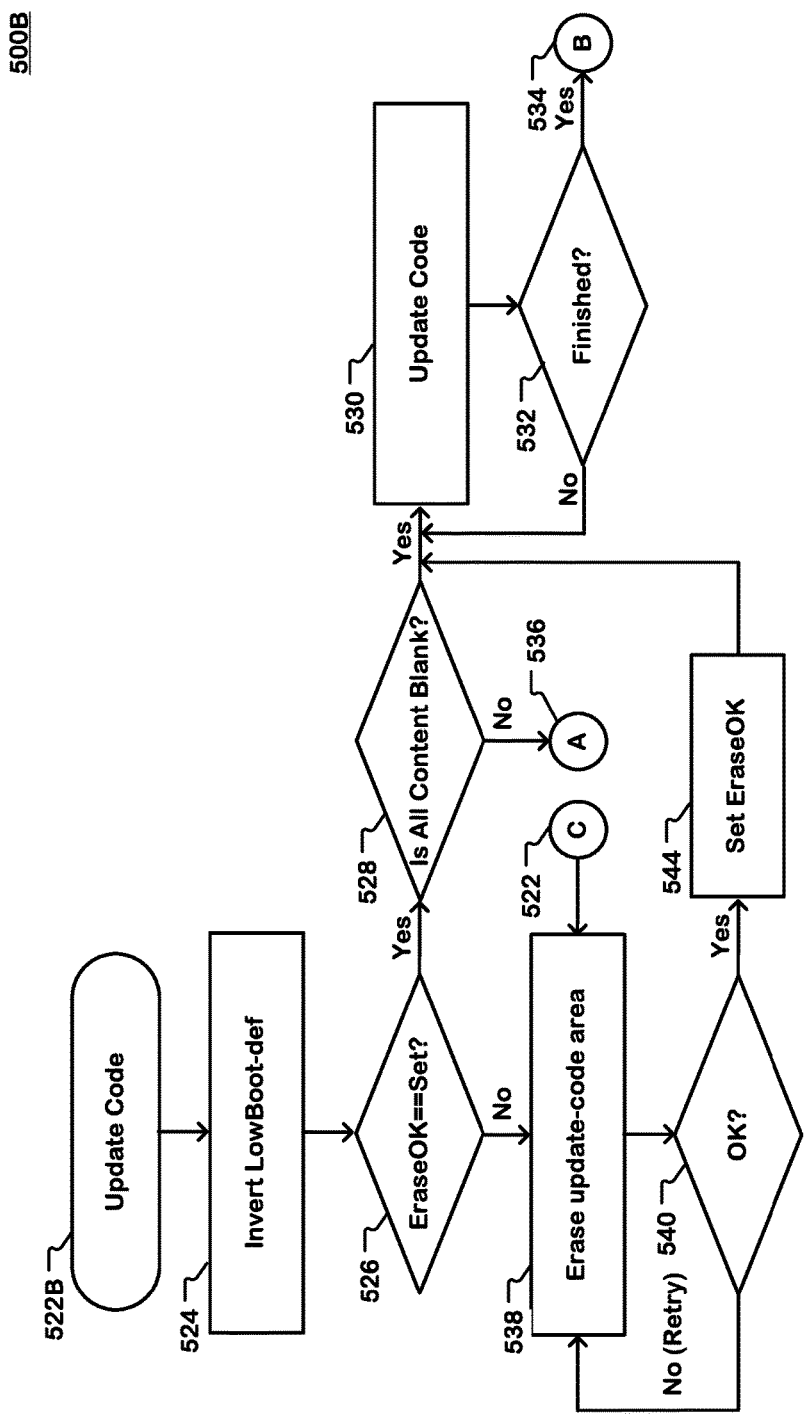
Figure 5C:
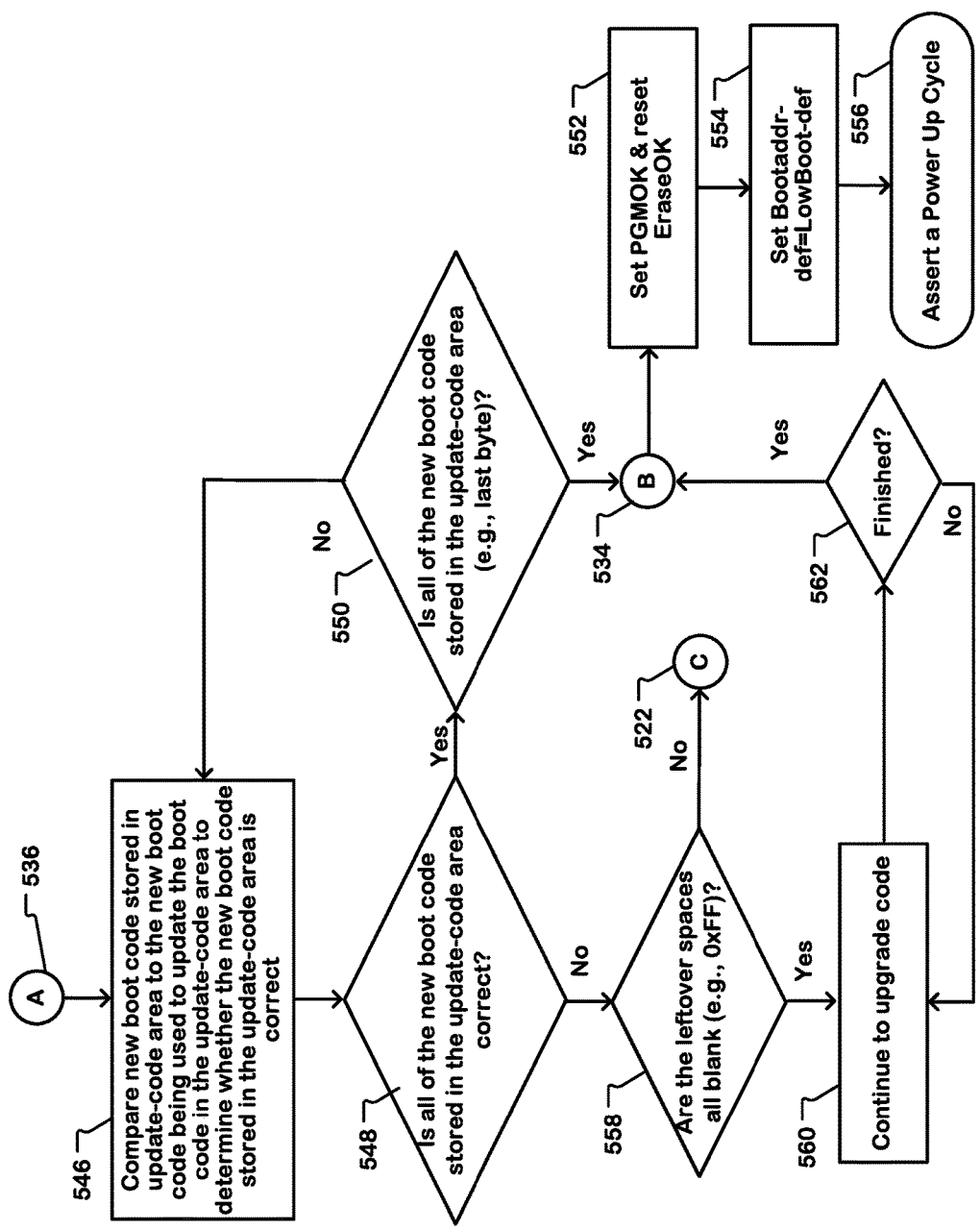

FIGS. 5A, 5B and 5C illustrate flow charts including the various operations that are performed in order to perform the update operation when the system is in the dual-area update mode. Specifically, flow charts 500A, 500B and 500C of FIGS. 5A, 5B and 5C illustrate the operations performed by the memory device 130 in order to operate in the dual-area update mode.

Referring to FIG. 5A, a flow chart 500A is illustrated. The operations described in flow chart 500A can be implemented by the system 100 (or equivalents thereof) described with reference to FIGS. 1-4. In operation 502 the system 100 performs a boot up.

After the boot up, the system 100, in operation 504, determines whether "lowboot-def" equals "bootaddr-def." The variable bootaddr-def has been described above, specifically with reference to FIG. 3. The variable "lowboot-def" is configured in operation 512, which is discussed in more detail below.

If lowboot-def equals bootaddr-def, then the system 100 performs operation 506, which determines that the upgrade of the code passes and then the system 100, in operation 508, goes to normal system operation and proceeds to read the updated code from the appropriate portion of the non-volatile memory 139.

If lowboot-def does not equal bootaddr-def in operation 504, then the system is still set to run the current boot code (i.e., not the updated boot code). As a result, the system 100 performs operation 510 which checks whether the variable "eraseOK" equals or has been "reset." EraseOk indicates whether an erase of the portion of the non-volatile memory 139 has taken place. If eraseOK has been reset, then the system 100 performs operation 512 in which bootaddr-def is set to equal lowboot-def, and then performs operation 514 to cause a reboot or assert a power up cycle. Since lowboot-def is equal to bootaddr-def because of operation 512, at the next system boot up in operation 502, operation 504 will make the determination of "YES" and the system will eventually go to normal system operation in operation 508.

If, in operation 510, the system 100 determines that eraseOK does not equal or has not been reset (i.e., the new boot code update is almost finished, but not completely), the system performs operation 516 to determine whether the variable "PGMOK" is equal to or has been set. If PGMOK has been set, then the system 100 performs operation 518, which resets eraseOK. After operation 518 the system 100 performs operation 512 and then proceeds as described above.

If, in operation, 516, the system 100 determines that PGMOK does not equal or has not been set (i.e., the update of the boot code is not finished), then the system 100 performs operation 520 to set lowboot-def to equal bootaddr-def.

Next, in operation 522A the system 100 updates the code, which is described in more detail in FIG. 5B. In FIG. 5B, flow chart 500B is illustrated, which continues the updating of the code in operation 522B. Next, in operation 524 the value of lowboot-def is inverted or flipped, such that "1" changes to "0" and "0" changes to "1."

After operation 524, the system 100 performs operation 526 to determine whether or not the variable "eraseOK" has been set. If eraseOK has been set, the system 100 moves to operation 528 to determine whether all content is blank and then to either operation 530 or procedure A 536, which is described in detail in FIG. 5C. In operation 530, the system 100 begins to update the code. The system 100 will periodically check whether or not the code is completely updated in operation 532. If the code is not completely updated, then the system 100 will just continue to perform operation 530. When operation 532 determines that the code is completely updated, then the system 100 will continue to procedure B 534, which is described in further detail in FIG. 5C.

Referring back to operation 526, when the system 100 determines that eraseOK has not been set, the system 100 will perform operation 538 to erase the update-code area (e.g., the update-code area 145, as illustrated in FIGS. 1-3). In operation 540 the system 100 determines whether the update-code area has been completely erased. If it has not been erased completely, the system 100 will return to operation 538 and attempt to erase the update-code area again.

If, in operation 540, the system 100 determines that the update-code area is completely erased, the system 100 will perform operation 544 to set eraseOK (i.e., eraseOK=set). Next, the system 100 will perform operation 530 as described above and eventually get to procedure B 534 once the code is completely updated.

Turning to FIG. 5C, procedure A 536 (from FIG. 5B) is illustrated, such that the system 100 will continue to operation 546 if operation 528 (see FIG. 5B) determines that all of the content (of the update-code area) is not blank. In operation 546 the system 100 compares new boot code stored in the update-code area to the new boot code being used to update the boot code in the update-code area to determine whether the new boot code stored in the update-code area is correct.

If the new boot code stored in the update-code area is determined to be correct in operation 548, the system 100 will perform operation 550 to check whether all of the new boot code stored is in the update-code area (i.e., is the last byte of the new boot code stored in the update-code area). If it is not, then the system returns to operation 546. If it is, then the operation proceeds to procedure B 534, and then to operation 552. Note that if the updating of the code in operation 532 is completely finished (see FIG. 5B) then procedure B 534 is invoked and operation 552 is performed.

In operation 552 the system 100 sets PGMOK and resets eraseOK. Next, the system sets bootaddr-def to equal lowboot-def (i.e., bootaddr-def=lowboot-def) in operation 554. Then, the system 100 reboots or asserts a power up cycle in operation 556, which will then cause the system 100 to perform the system boot up operation 502 of FIG. 5A.

Turning back to operation 548, if all of the new boot code stored in the update-code area is not correct, then the system 100 will perform operation 558. In operation 558 the system 100 checks to see whether the leftover spaces in the update-code area are blank. If they are not blank, the system 100 will invoke procedure C 522 causing the system 100 to perform operation 538 of FIG. 5B. Operation 538 is discussed above with reference to FIG. 5B, so redundant descriptions thereof are omitted.

In contrast, if all of the leftover spaces are blank, then the system 100 performs operation 560 by continuing to update the code in the update-code area. The system 100 will continue to check if the updating of the code in operation 560 is finished. If it is not finished, operation 560 will continue. When the updating of the code in operation 560 is finished (i.e., operation 562, which determines whether or not the upgrade of the code is finished, determines that operation 560 is finished), the system 100 will invoke procedure B 534 which causes the system 100 to perform operation 552, which is discussed in detail above. If operation 562 determines that operation 560 is not finished, then operation 560 will continue to upgrade the code and the system 100 will not move onto procedure B 534 until the upgrade to the code is finished. Note that after operation 556 performs a reboot, operation 502 will begin a system boot up. Because operation 554 of FIG. 5C sets bootaddr-def to equal lowboot-def, operation 504 of FIG. 5A will answer "Yes" and the system 100 will proceed to operations 506 and 508.

Figure 6:
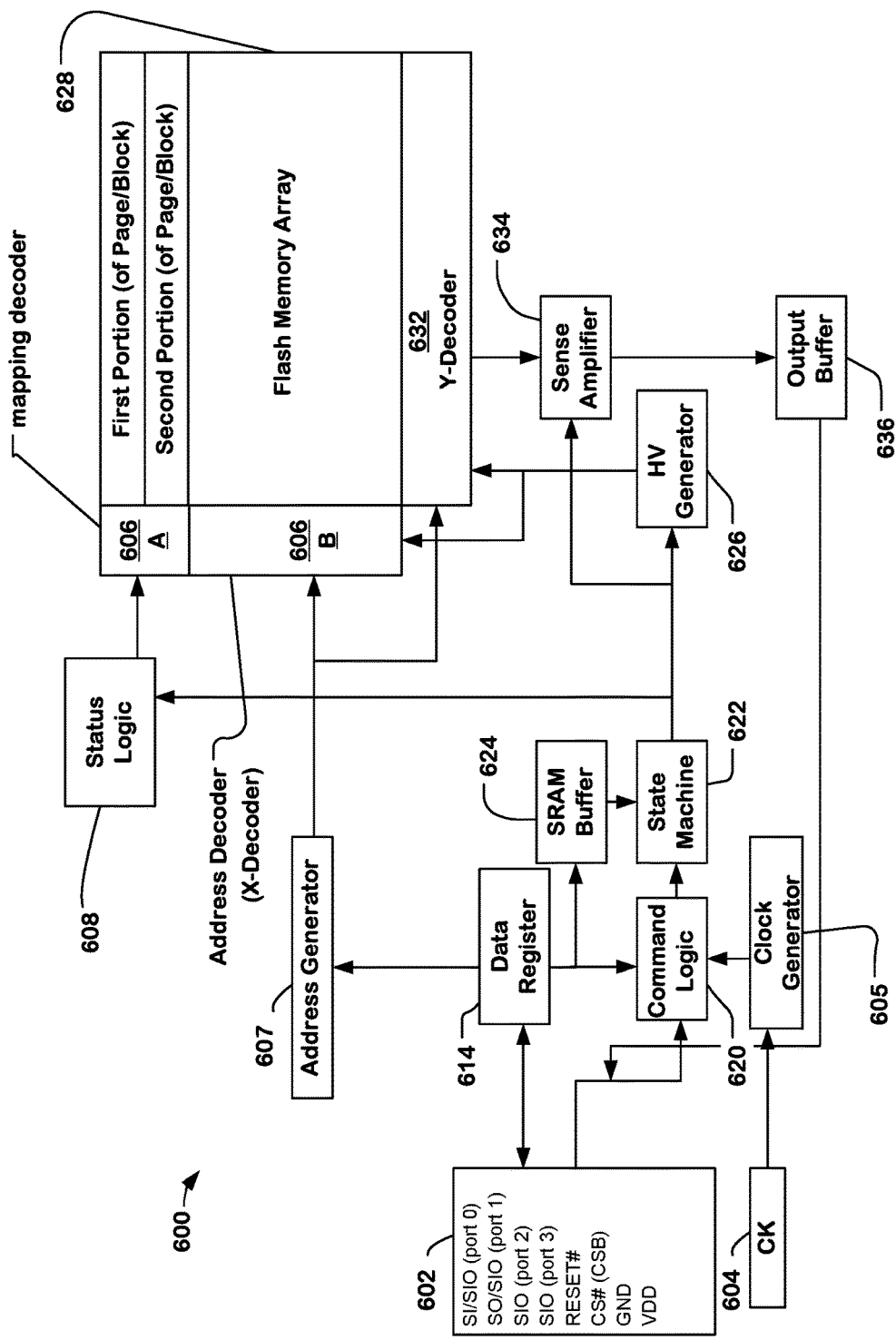
FIG. 6 is a simplified block diagram of an integrated circuit, for example, a NOR flash memory device, including command logic and control circuits supporting operations while in the dual-area update mode as described herein.

FIG. 6 is a simplified block diagram of an integrated circuit 600, for example, a NOR flash memory device, including command logic and control circuits supporting the "dual-area update mode" and related operations as described herein. The integrated circuit 600 can be implemented on a single chip. For example, some or all of the components (and the operations performed thereby) of the memory device 130 of FIGS. 1, 3 and 4 can be included in the integrated circuit 600. Alternatively, some of the components (and the operations performed thereby) of the memory controller 120 of FIG. 1 can be included in the integrated circuit 600.

I/O block 602 shows a synchronous serial interface compliant with a serial peripheral interface SPI standard, and having standard pins. CS# is chip select, which can correspond to the CSB line discussed above. When CS# is brought low the device is selected. The RESET# signal allows the device to be reset, terminating the currently running process and resetting the state machine. GND and VDD are ground and power supply, respectively. In standard SPI, SI and SO are serial data input and output, respectively. In Dual SPI operation, SI and SO become bidirectional I/O pins: SIO0 and SIO1. In Quad SPI operation, SIO2 and SIO3 are available for higher-speed transfer. This is an example only; many pin configurations are possible. Serial clock SLCK 604 (or just CK 604) is also provided. A clock generator 605 on the integrated circuit generates clock signals for the command logic 620 and other elements of the integrated circuit. In this embodiment the clock generator 605 receives the SLCK from the SLCK 604 pin. The bus interface represented by I/O block 602 can support double data rate (DDR) or single data rate (SDR) protocols.

Other types of serial interfaces can be used in various embodiments. Memory technologies other than NOR flash memory may be used.

A control signal used to indicate the beginning and ending of a command sequence described herein may be signals on one or more of the bus lines in the block 602 in some examples. For example, in some embodiments, CS# or RESET# may be toggled, such as being pulled low-to-high in a first transition or high-to-low in a second transition. Alternatively, or in addition, a termination event may be generated internally by the chip control logic.

Status logic 608 includes circuitry and logic configured to maintain a current status as well as perform some or all of the logic implemented by the status logic 138 and/or the control circuitry 134 of FIG. 1. The current status indicates whether (i) the first portion of the NOR flash memory array 628 is a current area storing information and the second portion of the NOR flash memory array 628 is available for being updated with updated information or (ii) the first portion of the NOR flash memory array 628 is available for being updated with the updated information and the second portion of the NOR flash memory array 628 is the current area storing the information. The NOR flash memory array 628 can be configured with pages/blocks having the first portion and the second portion. The first and second portions can be from the same bank or can be from different banks. As discuss in other portions of this disclosure, additional sets of portions (e.g., third and fourth portions) can also be configured. For this example only a first set of portions will be discussed. This structure regarding the sets of portions and the current status has been described in detail with reference to FIGS. 1-4.

The status logic 608 can contain logic that is able to indicate which portion, of the sets of portions of the NOR flash memory array 628, are designated for current code (e.g., the boot-code area 143) and for code to be updated (e.g., the update-code area 145). For example, the current status maintained by the status logic 608 can indicate that the first portion 142 is the boot-code area 143 or that the second portion 144 is the boot-code area 143, depending on the value of the variable bootaddr-def. Also, the current status maintained by the status logic 608 can indicate that the second portion 144 is the update-code area 145 or that the first portion 142 is the update-code area 145. If there are additional sets of portions, as mentioned above, the status logic 608 will also keep track of which portions of the other sets of portions are the boot-code area and/or the update-code area. More specifically, the status logic 608 can perform the inverting or the flipping of the most significant bit of the host address, referred to as HMSBaddr and as described with reference to FIG. 3. This inverting of the HMSBaddr by the status logic 608 is what causes the system to write/read to/from the first portion and/or the second portion, as described above. The status logic 608 can obtain these physical addresses of the first and second portions from the address generator 607 or from other components of the integrated circuit 600. As discussed with reference to FIGS. 1-4, functions of the status logic 138 can be implemented by the status logic 608.

A mapping decoder 606A performs the operations of, for example, the address decoder 136 including the map 137, as described with reference to FIGS. 1-4. Specifically, the mapping decoder 606A implements logic based on the status provided by the status logic 608 and maps command addresses to physical addresses of pages and banks (portions) of the physical memory, such as the NOR flash memory array 628, accordingly. The mapping decoder 606A can map the read command addresses and the write command addresses to the physical addresses of pages and banks (portions) of the physical memory based on a map, such as the map 137 of FIGS. 1, 3 and 4, and based on logic, such as the status logic 138 of FIGS. 1, 3 and 4.

The mapping decoder 606A, combined with other circuitry and logic of the integrated circuit 600, performs the operations of the dual-area update mode described with reference to FIGS. 1-5. Some redundant descriptions thereof are omitted. Specifically, it is noted that the status logic 608 in combination with the mapping decoder 606A, as well as other components of the integrated circuit 600, perform the operations described with reference to the flow charts 500A, 500B and 500C as illustrated in FIGS. 5A, 5B and 5C. In other words, the status logic 608 and the mapping decoder 606A perform, according to the operations described in FIGS. 5A-5C, the ping-ponging by reading/updating(writing) to the appropriate portions (i.e., the first portion and the second portion) of the flash BIOS memory array.

Address generator 607 includes circuits to provide the physical address sequences for access to the NOR flash memory array 628.

Data register 614 can act as an input buffer to store portions of command sequences in some embodiments. Data and parameters may be stored in SRAM buffer 624 in support of interruptible write operations, and other operations. In some examples, the data register 614 may be part of the SRAM buffer 624.

Integrated circuit 600 also includes command logic 620, which may generate internal control signals, and control circuitry such as a state machine 622 with supporting bias circuits. High-voltage generator 626 generates any higher voltages required, for example for read, program, and erase operations. The command logic 620 executes command procedures indicating read, write, erase and data associated therewith. The control circuitry including the state machine 622, in this example, executes embedded program, erase and read operations which access the memory array 628 when enabled by the command logic.

Memory array 628 includes, in addition to the mapping decoder 606A, X-decoder 606B and Y-decoder 632, and data signals are output via sense amplifier 634. Output buffer 636 may hold output data for output from the device.

In the example shown in FIG. 6, a command sequence comprises a sequence of bytes received on the SIO pins in the I/O block 602. The command logic 620 can include logic to decode the operation code, route the start address to the address counter, and provide control signals to set up and initiate embedded processes identified in the command sequences, including write (e.g. program and erase) and read processes using the state machine 622. The example shown in FIG. 6 is a serial flash device using a serial bus interface for sequential data access. The serial bus interface includes at least one synchronous clock signal CK, data signals, where the width of the storage unit carrying the data is greater than or equal to one bit, and at least one chip select signal CSB. Using a serial bus interface, the command sequences described above can be supported.

This configuration can be used to support buses compliant with the serial peripheral interface SPI standard bus architecture, where the CS corresponds with the SPI active low chip select CSB, the CK corresponds with the SPI serial clock SLCK; port 0 corresponds with the SPI master-out/slave-in MOSI port, the port 1 corresponds with the SPI first master-in/slave-out MISO1 port; port 2 corresponds with the SPI second master-in/slave-out MISO2 port; and port 3 corresponds with the SPI third master-in/slave-out MISO3 port. The technology described herein can be used with other standard and non-standard bus architectures, including for example I2C.

Those skilled in the art will appreciate that this diagram is provided for example of one embodiment only; a device supporting interruptible write command sequences as described herein may vary widely from this diagram, comprising different elements, connected in different ways.

The embodiment shown in FIG. 6 includes a NOR flash memory array 628, which can be a memory array configured for storing boot code or a BIOS, or any other type of non-volatile information. Other types of memory systems can be utilized as well, including nonvolatile memory types including phase change memory PCM, resistive memory element memory known as ReRAM or RRAM, NAND flash memory, magnetoresistive memory, and so on. Also, other types of memory systems can be utilized that may include volatile memory such as DRAM.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, state machines implemented in circuitry and by combinations of dedicated logic hardware and computer programs. With all flowcharts herein, it will be appreciated that many of the steps can be combined, performed in parallel, or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
   a non-volatile memory configured with a block having a first portion and a second portion, wherein:
     the first portion is represented by a first range of physical addresses; and
     the second portion is represented by a second range of physical addresses;
   an address decoder that maps received command addresses to physical addresses of the non-volatile memory; and
   control circuitry configured to maintain a current status indicating whether (i) the first portion of the nonvolatile memory is a current area storing information and the second portion of the non-volatile memory is available for being updated with updated information or (ii) the first portion of the non-volatile memory is available for being updated with the updated information and the second portion of the non-volatile memory is the current area storing the information, and to implement an update operation including:

responsive to receiving a write command sequence including a write command address of the block, causing the address decoder to (i) map the write command address to one of the first portion and the second portion, selected in response to the current status and (ii) update the selected one of the first portion and the second portion with the updated information; and upon completion of the updating of the selected one of the first portion and the second portion, changing the current status to indicate that the selected one of the first portion and the second portion is the current area storing the information and to indicate that the unselected one of the first portion and the second portion is available for being updated with the updated information.

2. The memory device of claim 1, wherein the unselected one of the first portion and the second portion is write protected until the current status is changed to indicate that the unselected one of the first portion and the second portion is available for being updated with the updated information.

3. The memory device of claim 1, wherein:
the selected one of the first portion and the second portion remains unlocked for writing until the current status is changed to indicate that the selected one of the first portion and the second portion is the current area storing the information; and
after the current status is changed, the selected one of the first portion and the second portion is write protected.

4. The memory device of claim 1, wherein the block of the non-volatile memory is a boot block.

5. The memory device of claim 4, wherein the current area, which is the unselected one of the first portion and the second portion, stores current boot code for booting up a computer system.

6. The memory device of claim 5, wherein:
an area that is available to be updated with the updated information is from the selected one of the first portion and the second portion; and
the updated information that is used to update the available area is updated boot code.

7. The memory device of claim 6, wherein the update operation further includes keeping the current area storing the current boot code write protected from a writing operation until the completion of the changing of the current status.

8. The memory device of claim 6, wherein the update operation further includes keeping the current area storing the current boot code write protected from a writing operation until the completion of the mapping, the updating of the information and the changing of the current status.

9. The memory device of claim 1, wherein the update operation further includes, upon completion of the changing of the current status, erasing contents of the unselected one of the first portion and the second portion indicated as being available for being updated with the update information.

10. The memory device of claim 1, wherein the update operation causes the address decoder to map the write command address to one of the first portion and the second portion by one of (i) inverting a most significant bit of the received write command address and (ii) leaving the most significant bit of the received write command address as it is.

11. The memory device of claim 10, wherein control circuitry determines whether to invert the most significant bit or to leave the most significant bit in dependence upon a status indicator indicating whether to implement a first configuration and a second configuration.

12. The memory device of claim 11, wherein the control circuitry leaves the most significant bit of the received write command address as it is when the status indicator indicates the first configuration and the control circuitry inverts the most significant bit of the received write command address when the status indicator indicates the second configuration.

13. The memory device of claim 10, wherein the most significant bit of the received write command address is combined with remaining bits of the received write command address, regardless of whether the most significant bit is inverted or remains as it is.

14. The memory device of claim 13, wherein the combined most significant bit and the remaining bits of the received write command address are received by the address decoder to map the combined most significant bit and the remaining bits to the one of the first portion and the second portion corresponding to the combined most significant bit and the remaining bits and to update the one of the first portion and the second portion with the updated information.

15. The memory device of claim 1, wherein the update operation further includes, prior to changing the current status, verifying accuracy of the updated information.

16. The memory device of claim 15, wherein the accuracy of the updated information written to the selected one of the first portion and the second portion is verified by comparing and detecting differences between (i) the updated information written to the selected one of the first portion and the second portion and (ii) the updated information stored elsewhere.

17. A method of operating a memory device, comprising:
configuring a non-volatile memory of the memory device with a block having a first portion and a second portion, wherein:
the first portion is represented by a first range of physical addresses; and
the second portion is represented by a second range of physical addresses;
mapping, by an address decoder, received command addresses to physical addresses of the non-volatile memory;
maintaining a current status indicating whether (i) the first portion of the non-volatile memory is a current area storing information and the second portion of the non-volatile memory is available for being updated with updated information or (ii) the first portion of the non-volatile memory is available for being updated with the updated information and the second portion of the non-volatile memory is the current area storing the information; and
implementing an update operation including:
responsive to receiving a write command sequence including a write command address of the block, causing the address decoder to (i) map the write command address to one of the first portion and the second portion, selected in response to the current status and (ii) update the selected one of the first portion and the second portion with the updated information; and upon completion of the updating of the selected one of the first portion and the second portion, changing the current status to indicate that the selected one of the first portion and the second portion is the current area storing the information and to indicate that the unselected one of the first portion and the second portion is available for being updated with the updated information.

18. The method of claim 17, wherein the update operation further includes, upon completion of the changing of the current status, erasing contents of the unselected one of the first portion and the second portion indicated as being available for being updated with the update information.

19. A method of manufacturing a memory device including:
providing a non-volatile memory configured with a block having a first portion and a second portion, wherein:
the first portion is represented by a first range of physical addresses; and
the second portion is represented by a second range of physical addresses;
providing and configuring an address decoder that maps received command addresses to physical addresses of the non-volatile memory; and
providing control circuitry configured to maintain a current status indicating whether (i) the first portion of the non-volatile memory is a current area storing information and the second portion of the non-volatile memory is available for being updated with updated information or (ii) the first portion of the non-volatile memory is available for being updated with the updated information and the second portion of the non-volatile memory is the current area storing the information, and to implement an update operation including:
responsive to receiving a write command sequence including a write command address block, causing the address decoder to (i) map the write command address to one of the first portion and the second portion, selected in response to the current status and (ii) update the selected one of the first portion and the second portion with the updated information; and
upon completion of the updating of the selected one of the first portion and the second portion, changing the current status to indicate that the selected one of the first portion and the second portion is the current area storing the information and to indicate that the unselected one of the first portion and the second portion is available for being updated with the updated information.

20. The method of claim 19, wherein the update operation further includes, upon completion of the changing of the current status, erasing contents of the unselected one of the first portion and the second portion indicated as being available for being updated with the update information.

* * * * *